Feb. 3, 1953 W. A. HELSTEN 2,627,325
BRAKE ROTOR
Filed Aug. 6, 1949

INVENTOR.
Wesley A. Helsten
BY
Orrin O. B. Garner
Atty.

Patented Feb. 3, 1953

2,627,325

UNITED STATES PATENT OFFICE 2,627,325

BRAKE ROTOR

Wesley A. Helsten, Chicago, Ill., assignor to American Steel Foundries, Chicago, Ill., a corporation of New Jersey Application August 6, 1949, Serial No. 108,875

2 Claims. (Cl. 188—218)

This invention relates to off-wheel brake equipment and more specifically to a brake disk or rotor designed for connection to an associated rotating member whereby said member may be decelerated by friction means applied to the rotor.

In the present development of off-wheel railway brakes, it has been found necessary to develop a particularly rigid structure capable of withstanding the severe stresses encountered in high speed service and dissipating a tremendous amount of heat generated during braking action.

The general object of the invention is to devise a rotor of simple form which may be made as a single casting and wherein the required strength as well as the heat dissipating qualities are afforded and which at the same time meets practical requirements of manufacture as well as necessary operating conditions.

Another object of the invention is to provide a rotor such as above described which will function as a centrifugal or peripheral blower, air inlets being afforded whereby air may be drawn between spaced annular friction plates of the rotor and thrown outwardly by means of vanes and blades extending between the plates.

A more specific object is to design a rotor wherein the vanes and the blades are arranged to impel the air radially of the rotor and wherein the vanes also direct the air axially of the rotor against the friction plates.

The invention contemplates a rotor comprising a pair of friction plates integrally united at spaced points by radially arranged blades extending therebetween and connected to a support structure, each plate being provided with heat radiating radial vanes or fins extending between the plates, the blades and vanes serving to impel the air radially outwardly and the vanes on one plate being arranged in overlapping alternating relationship with the vanes on the other plate circumferentially of the rotor between the blades and functioning to direct the air against the plates.

The invention comprehends a rotor wherein the vanes are formed and arranged to effect a turbulent flow of air against the friction plates.

These and other objects of the invention will become more apparent from the specification and the drawings, wherein.

Figure 1:
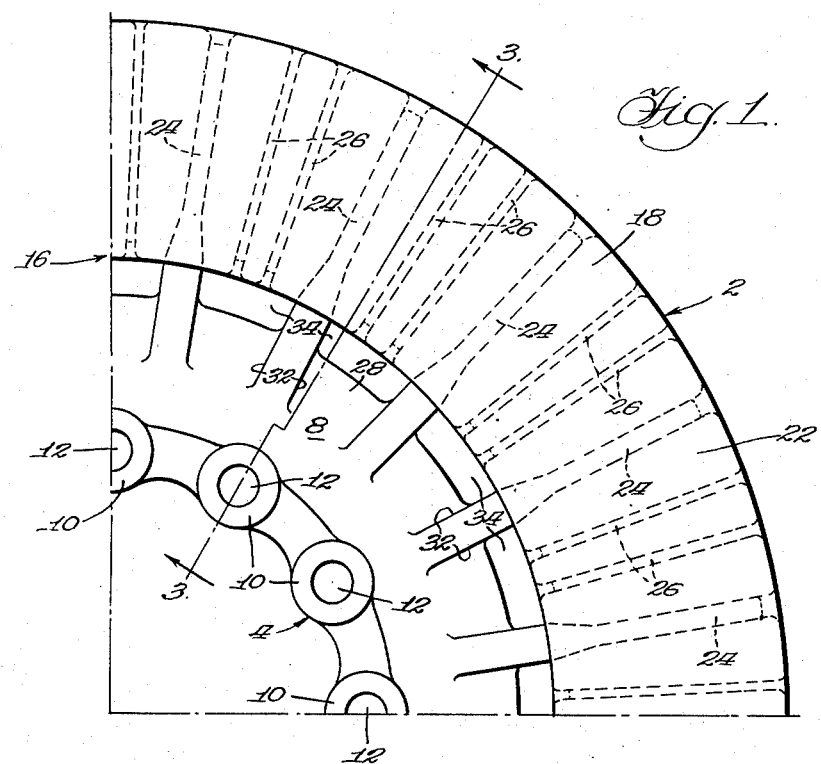
Figure 1 is a fragmentary side elevational view of the novel brake rotor.
Figure 3:
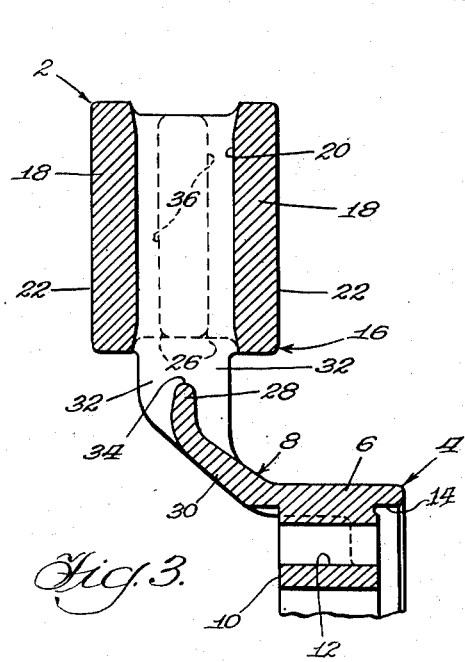
Figure 3 is a sectional view taken substantially in the radial planes indicated by the line 3—3 of Figure 1.

Referring to the drawings in detail, the rotor generally designated 2 comprises a support structure generally indicated 4, said support structure including a cylindrical hub 6 integrally formed with a bell-like member 8, the shape of which is best seen in Figure 3. The hub portion 6 of the support member 4 comprises a plurality of spaced bosses 10, 10 with openings 12 therethrough. It will be readily apparent to those skilled in the art that the bore 14 in the hub portion 6 may be fitted over a complementary portion on an associated rotating member and may be secured thereto by any convenient means, such as bolts (not shown), extending through openings 12, 12. It may be observed from a consideration of Figure 3 that the shape of the bell-like member 8 and the substantial thickness thereof affords a support member of great strength and rigidity.

A brake ring, designated as a whole by reference numeral 16, surrounds the bell-like portion 8 and comprises a pair of axially spaced, generally parallel, annular friction plates 18, 18 extending generally perpendicular to the axis of the rotor, said plates defining a fluid chamber 20 therebetween and presenting radial friction faces 22, 22 on their remote sides adapted for engagement with brake shoes (not shown) for decelerating the rotor, as will be readily understood by those skilled in the art. The two friction plates are integrally united to one another at suitable preferably equally spaced intervals by radially arranged blades 24, 24 extending therebetween to produce a very rigid structure. The blades serve as columns to resist braking pressures applied against faces 22, 22 and also function as blades of a centrifugal or peripheral blower. Large air spaces remain between consecutive blades 24 within chamber 20. Each air space has a plurality of heat radiating, radially arranged vanes or fins 26, 26 spaced from each other circumferentially of the rotor and connected to the inner sides of the respective plates 18, 18. The vanes extend from the inner to the outer peripheries of the plates and the vanes on one plate are arranged in overlapping relationship with the vanes on the other plate circumferentially of the rotor and are substantially thinner than blades 24, 24.

The brake ring 16 is integrally united with the support 4 by the blades 24 which are thickened at their inner ends and extend radially inwardly of the inner peripheries of the plates 18, 18 and are integrally joined centrally with the opposite sides and outer edge of an outturned annular flange 28 on a body section 30 (Figure 3) of the member 8 of the support structure. The blades 24 are also formed integral with opposite sides of the body section 30, which extends diagonally axially with respect to the rotor, to provide a rigid construction.

Figure 2:
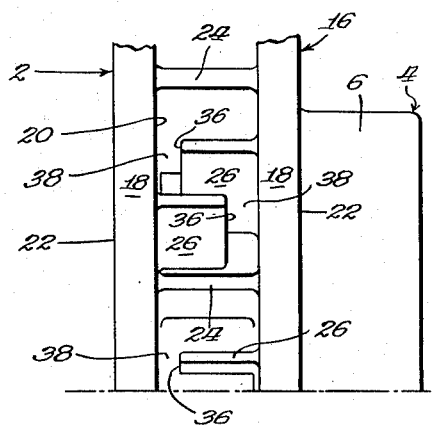
Figure 2 is a fragmentary edge view as seen from the right of Figure 1.

In operation, during rotation of the rotor air is drawn into the chamber 20 through inlets indicated at 32, 32 at opposite sides of member 8 of the support, said inlets being defined by the inner ends of consecutive blades 24, 24 and the member 8 and the inner peripheries of the plates 18, 18. The inlets 32, 32 at opposite sides of the rotor communicate through axial openings 34, 34 defined by the outer periphery of flange 28 and the inner perimeter of the brake ring. The air is impelled radially outwardly of the rotor by the blades 24 and the vanes 26. A large portion of the air which is struck by the vanes is caused to move radially outwardly of the rotor, thereby cooling the vanes by withdrawing or absorbing the heat conducted thereto by the respective plates. It will be noted that the arrangement of the vanes causes a portion of the air to flow axially of the rotor and strike the plates 18, 18 as the air moves around the free edges 36, 36 of the vanes. The vanes 26 define a zagged passage of S pattern circumferentially of the rotor and effect a turbulent flow of air through the chamber 22 inasmuch as the air, moving circumferentially of the rotor through the passages 38 (Figure 2) between the free end 36 of each blade 26 and the adjacent plate, will collide with the particles of air flowing radially of the rotor. The turbulent flow of air through the chamber 20 prevents the formation of insulating films of air on the interior sides of the plates 18, 18 and on the faces of the vanes 26 and blades 24.

I claim:

1. In a rotor, a support member comprising a central hub and an integral bell-like element at one end of said hub, said element comprising a body portion extending diagonally axially of said rotor and an integral, annular, outturned, radial flange at the outer periphery of said body portion, a brake ring surrounding said member and comprising spaced plates extending generally perpendicular to the axis of rotation of said rotor and presenting friction faces on their remote sides and defining a fluid chamber therebetween, a plurality of radially arranged, spaced blades between and integrally uniting said plates, the inner extremities of said blades extending radially inwardly of said plates and merging centrally with the outer periphery of said flange and with opposite sides of said flange and body portion, said element and blades defining fluid inlets with the inner peripheries of said plates communicating with said chamber, and radially arranged, spaced vanes within said chamber between said blades on each plate and extending axially of said rotor toward the other of said plates, adjacent vanes being arranged in staggered overlapping relationship circumferentially of the rotor to define a circumferential passageway of substantially S shape.

2. In a brake rotor, a brake ring comprising two annular plates interconnected by a plurality of blades extending therebetween, said blades extending at their radially inner extremities inwardly of said ring, a support comprising an annular member spaced radially inwardly with respect to the inner peripheries of said plates and merging with the central portions of the inner extremities of said blades, the outer periphery of said member defining openings with the inner periphery of said ring open to opposite sides of said rotor and to the space between said plates, and radially arranged, spaced vanes on each plate in the space between said plates and blades and defining radial passage means therewith communicating with said openings, the vanes on one plate being arranged in staggered overlapping relationship and alternated with the vanes on the other plate circumferentially of the rotor, the vanes on each plate being spaced axially with respect to the other plate and defining passages therewith communicating with said passage means, said passages and passage means being formed and arranged in an S pattern circumferentially of the rotor.

WESLEY A. HELSTEN.

REFERENCES CITED

The following references are of record in the file of this patent:

UNITED STATES PATENTS

| Number | Name | Date |
|---|---|---|
| 2,215,420 | Eksergian | Sept. 17, 1940 |
| 2,411,067 | Tack | Nov. 12, 1946 |